US012469449B2

(12) United States Patent
Choi et al.

(10) Patent No.: US 12,469,449 B2
(45) Date of Patent: Nov. 11, 2025

(54) ELECTROLUMINESCENT DISPLAY APPARATUS AND DRIVING METHOD THEREOF

(71) Applicant: LG Display Co., Ltd., Seoul (KR)

(72) Inventors: Ji Su Choi, Paju-si (KR); Kyung Hyun Lim, Paju-si (KR); Yu Hee Kim, Paju-si (KR)

(73) Assignee: LG Display Co., Ltd (KR)

( * ) Notice: Subject to any disclaimer, the term of this patent is extended or adjusted under 35 U.S.C. 154(b) by 0 days.

(21) Appl. No.: 18/544,636

(22) Filed: Dec. 19, 2023

(65) Prior Publication Data

US 2024/0257750 A1 Aug. 1, 2024

(30) Foreign Application Priority Data

Jan. 30, 2023 (KR) ........................ 10-2023-0011844

(51) Int. Cl.
*G09G 3/3233* (2016.01)

(52) U.S. Cl.
CPC ... *G09G 3/3233* (2013.01); *G09G 2300/0842* (2013.01); *G09G 2320/0233* (2013.01); *G09G 2320/045* (2013.01)

(58) Field of Classification Search
CPC .. G09G 3/3258; G09G 3/3275; G09G 3/3291; G09G 3/3233; G09G 2320/0233; G09G 2320/0626; G09G 2320/0673; G09G 2320/0295; G09G 2320/0693; G09G 2320/043; G09G 2300/0819; G09G 2310/08; G09G 2320/045; G09G 3/3208; G09G 3/006
See application file for complete search history.

(56) References Cited

U.S. PATENT DOCUMENTS

| | | | | |
|---|---|---|---|---|
| 2016/0189618 A1* | 6/2016 | Park | ..................... | G09G 3/3266 345/77 |
| 2021/0150966 A1* | 5/2021 | Yang | ..................... | G09G 3/3233 |
| 2022/0076637 A1* | 3/2022 | Park | ..................... | G09G 3/3275 |
| 2023/0119909 A1* | 4/2023 | Yang | ..................... | G09G 3/2092 345/55 |

* cited by examiner

*Primary Examiner* — Xuemei Zheng
(74) *Attorney, Agent, or Firm* — Fish & Richardson P.C.

(57) ABSTRACT

An electroluminescent display apparatus includes a display panel, a sensing circuit performing a first sensing process on some pixels of the display panel to obtain a normal sensing value during a first sensing period and performing a second sensing process on all pixels of the display panel to obtain a temporary sensing value during a second sensing period, and a compensation circuit calculating a temporary sensing deviation value between adjacent pixels, based on the temporary sensing value, obtaining a compensation value for the some pixels, based on the normal sensing value, and obtaining a delta compensation value for the other pixels except the some pixels, based on the normal sensing value and the temporary sensing deviation value.

13 Claims, 10 Drawing Sheets

ELECTROLUMINESCENT DISPLAY APPARATUS AND DRIVING METHOD THEREOF

CROSS-REFERENCE TO RELATED APPLICATION

This application claims the priority of Korean Patent Application No. 10-2023-0011844 filed on Jan. 30, 2023, which is hereby incorporated by reference in its entirety.

BACKGROUND

Field of the Disclosure

The present disclosure relates to an electroluminescent display apparatus and a driving method thereof.

Description of the Background

In electroluminescent display apparatuses having an active matrix type, a plurality of pixels each including a light emitting device and a driving element are arranged as a matrix type, and the luminance of an image implemented by the pixels is adjusted based on a gray level of image data. The driving element controls a pixel current flowing in the light emitting device, based on a voltage (hereinafter referred to as a gate-source voltage) applied between a gate electrode and a source electrode thereof. The amount of light emitted by the light emitting device and the luminance of a screen are determined based on a pixel current.

A threshold voltage of the driving element determines a level of a pixel current, and thus, should be constant in all pixels. However, there is a threshold voltage deviation between pixels due to various causes. Such a device characteristic difference causes a luminance deviation, and due to this, there is a limitation in implementing a desired image.

Technology for sensing and compensating for threshold voltages of pixels has been known, but the usability thereof is low because a sensing time needed for sensing of a threshold voltage is long.

SUMMARY

Accordingly, the present disclosure is directed to a an electroluminescent display apparatus and a driving method thereof that substantially obviate one or more of problems due to limitations and disadvantages described above.

More specifically, the present disclosure is to provide an electroluminescent display apparatus and a driving method thereof, which can decrease a threshold voltage sensing time for each of pixels and may increase threshold voltage compensation performance.

To achieve these and other advantages and in accordance with the present disclosure, as embodied and broadly described herein, an electroluminescent display apparatus includes a display panel, a sensing circuit performing a first sensing process on some pixels of the display panel to obtain a normal sensing value during a first sensing period and performing a second sensing process on all pixels of the display panel to obtain a temporary sensing value during a second sensing period, and a compensation circuit calculating a temporary sensing deviation value between adjacent pixels, based on the temporary sensing value, obtaining a compensation value for the some pixels, based on the normal sensing value, and obtaining a delta compensation value for the other pixels except the some pixels, based on the normal sensing value and the temporary sensing deviation value.

In another aspect of the present disclosure, a driving method of an electroluminescent display apparatus includes performing a first sensing process on some pixels of a display panel to obtain a normal sensing value during a first sensing period, performing a second sensing process on all pixels of the display panel to obtain a temporary sensing value during a second sensing period, calculating a temporary sensing deviation value between adjacent pixels, based on the temporary sensing value, and obtaining a compensation value for the some pixels, based on the normal sensing value, and obtaining a delta compensation value for the other pixels except the some pixels, based on the normal sensing value and the temporary sensing deviation value.

According to the present disclosure, a total sensing time according to the present aspect may be considerably shortened compared to a case where the slow sensing is performed on all pixels. Also, in the present aspect, because a delta compensation value based on a temporary sensing value is applied to pixels on which the slow sensing is not performed, threshold voltage compensation performance on pixels on which the slow sensing is not performed may be considerably enhanced compared to a case where a calculation compensation value based on the simple interpolation scheme is applied.

It is to be understood that both the foregoing general description and the following detailed description are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this disclosure, illustrate aspects of the disclosure and together with the description serve to explain the principle of the disclosure.

In the drawings.

DETAILED DESCRIPTION

Figure 1:
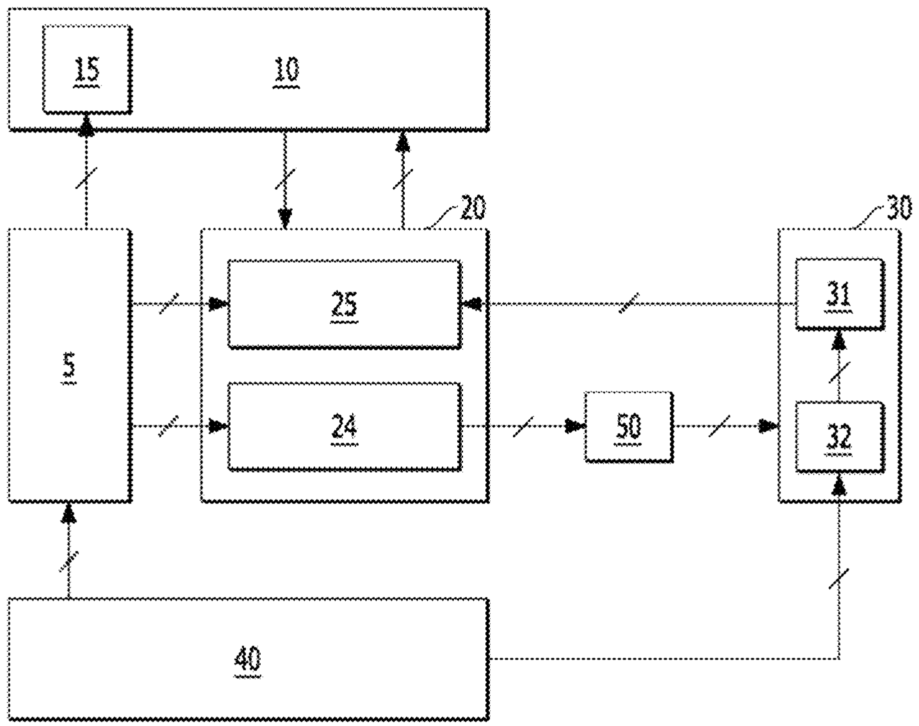
FIG. 1 is a diagram illustrating an electroluminescent display apparatus according to an exemplary present aspect of the present disclosure.

Hereinafter, the present disclosure will be described more fully with reference to the accompanying drawings, in which exemplary aspects of the disclosure are shown. The disclosure may, however, be embodied in many different forms and should not be construed as being limited to the aspects set forth herein; rather, these aspects are provided so that this disclosure will be thorough and complete, and will fully convey the concept of the disclosure to those skilled in the art.

Advantages and features of the present disclosure, and implementation methods thereof will be clarified through following aspects described with reference to the accompanying drawings. The present disclosure may, however, be embodied in different forms and should not be construed as limited to the aspects set forth herein. Rather, these aspects are provided so that this disclosure will be thorough and complete, and will fully convey the scope of the present disclosure to those skilled in the art. Furthermore, the present disclosure is only defined by scopes of claims.

The shapes, dimensions, sizes, ratios, angles, numbers and the like disclosed in the drawings for description of various aspects of the present disclosure are merely exemplary and the present disclosure is not limited thereto. Like reference numerals refer to like elements throughout. Throughout this specification, the same elements are denoted by the same reference numerals. As used herein, the terms “comprise”, “have”, “contain”, “consist of”, “make up of”, “formed of”, “include” and the like suggest that other parts may be added unless the term such as “only”, “merely”, etc. is used. As used herein, the singular forms “a”, “an”, and “the” are intended to include the plural forms as well, unless context clearly indicates otherwise.

Elements in various aspects of the present disclosure are to be interpreted as including margins of error even without explicit statements.

In describing a position relationship, for example, when a position relation between two parts is described as “on~”, “over~”, “under~”, and “next~”, “below~”, “beneath~”, “above”, “near”, “close to”, “adjacent to,” “beside”, etc., one or more other parts may be disposed between the two parts unless “just” or “direct(ly)” is used. Furthermore, the terms “left”, “right”, “top”, “bottom”, “downward”, “upward”, “upper”, “lower” and the like refer to an arbitrary frame of reference.

It will be understood that, although the terms “first”, “second”, “A”, “B”, “(a)”, “(b)”, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

In the specification, a pixel circuit provided on a substrate of a display panel may be implemented with a thin film transistor (TFT) having an n-type metal oxide semiconductor field effect transistor (MOSFET) structure, but is not limited thereto and may be implemented with a TFT having a p-type MOSFET structure. A TFT may be a three-electrode element which includes a gate, a source, and a drain. The source may be an electrode which supplies a carrier to a transistor. In the TFT, a carrier may start to flow from the source. The drain may be an electrode which enables the carrier to flow out from the TFT. That is, in a MOSFET, the carrier flows from the source to the drain. In the n-type TFT (NMOS) because a carrier is an electron, a source voltage may have a lower voltage than a drain voltage so that the electron flows from the source to the drain. In the n-type TFT, because the electron flows from the source to the drain, a current may flow from the drain to the source. On the other hand, in the p-type TFT (PMOS), because a carrier is a hole, a source voltage may be higher than a drain voltage so that the hole flows from the source to the drain. In the p-type TFT, because the hole flows from the source to the drain, a current may flow from the source to the drain. It should be noted that a source and a drain of a MOSFET are not fixed but be switched therebetween. For example, the source and the drain of the MOSFET may be switched therebetween.

Moreover, in the present disclosure, a semiconductor layer of a TFT may be implemented with at least one of an oxide element such as low temperature polycrystalline oxide (LTPO), an amorphous silicon element, and a polysilicon element such as low temperature poly-Si.

Hereinafter, aspects of the present disclosure will be described in detail with reference to the accompanying drawings. In the following description, when the detailed description of the relevant known function or configuration is determined to unnecessarily obscure the important point of the present disclosure, the detailed description will be omitted.

Figure 2:
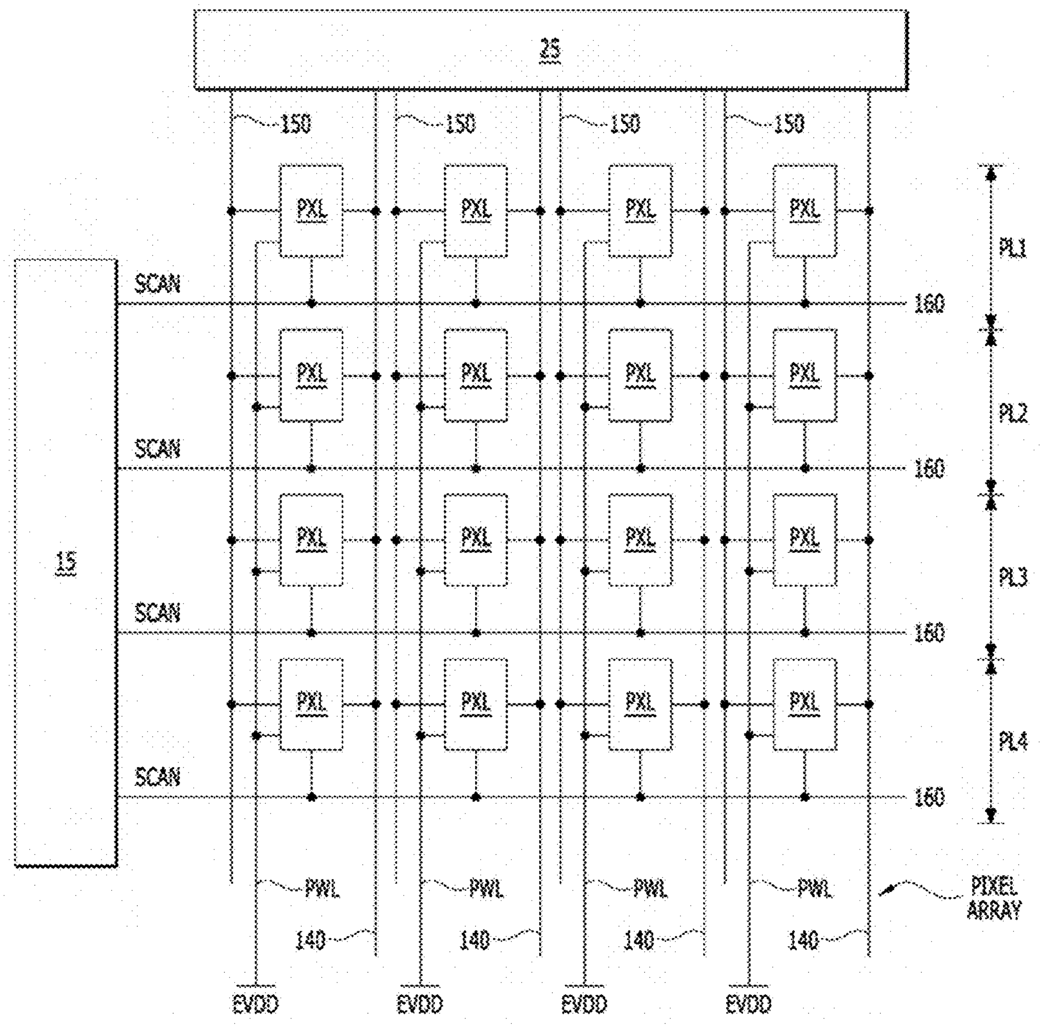
FIG. 2 is a diagram illustrating an example of a pixel array included in a display panel according to the an exemplary aspect of the present disclosure.

FIG. 1 is a diagram illustrating an electroluminescent display apparatus according to the present aspect. FIG. 2 is a diagram illustrating an example of a pixel array included in a display panel.

Referring to FIGS. 1 and 2, the electroluminescent display apparatus according to an aspect of the present disclosure may include a timing controller 5, a display panel 10, a driver integrated circuit (IC) 20, a compensation IC 30, a host system 40, and a storage memory 50, without being limited thereto. A gate driving circuit 15 included in the display panel 10 and a data driving circuit 25 embedded in the driver IC 20 may drive pixels PXL included in the display panel 10. Alternatively, the data driving circuit 25 may be included in the display panel 10, and the gate driving circuit 15 may be embedded in the driver IC 20.

The display panel 10 may include a plurality of pixel lines PL1 to PL4, and each of the pixel lines PL1 to PL4 may include a plurality of pixels PXL and a plurality of signal lines. A “pixel line” described herein may not be a physical signal line and may denote a set of signal lines and pixels PXL adjacent to one another in extension any direction. The signal lines may include a plurality of data lines 140 for supplying a display data voltage and a sensing data voltage, a plurality of reference voltage lines 150 for supplying a reference voltage to the pixels PXL, a plurality of gate lines 160 for supplying a gate signal SCAN to the pixels PXL, a plurality of high level power lines PWL for supplying a high level pixel voltage EVDD to the pixels PXL, a plurality of low level power lines for supplying a low level pixel voltage to the pixels PXL (not shown) and the like. The reference voltage line 150 may be used as a sensing line in sensing driving. Hereinafter, the reference voltage line 150 may be referred to as a sensing line.

The pixel PXL of the display panel 10 may be arranged as a matrix type to configure a pixel array. Each pixel PXL included in the pixel array of FIG. 2 may be connected with one of the data lines 140, one of the reference voltage lines 150, one of the high level power lines PWL, and one of the gate lines 160. Alternatively, each pixel PXL included in the pixel array of FIG. 2 may be connected with the plurality of gate lines 160 or the plurality of data lines 140. Also, each pixel PXL included in the pixel array of FIG. 2 may be further supplied with a high level pixel voltage and a low level pixel voltage from a power circuit (not shown).

The timing controller 5 may generate a gate timing control signal for controlling an operating timing of the gate driving circuit 15 and a data timing control signal for controlling an operating timing of the data driving circuit 25 with reference to timing signals (for example, a vertical synchronization signal Vsync, a horizontal synchronization signal Hsync, a dot clock signal DCLK, and a data enable signal DE) input from the host system 40.

The data timing control signal may include a source start pulse, a source sampling clock, and a source output enable signal, but is not limited thereto. The source start SSP may control the data sampling start timing of the data driving circuit 25. The source sampling clock may control the data sampling timing of the data driving circuit 25. The source output enable signal may control the output timing of the data driving circuit 25. The gate timing control signal may include a gate start pulse, a gate output enable signal and a gate shift clock, but is not limited thereto. The gate start pulse may be applied to a gate stage which generates a first gate output and may activate an operation of the gate stage. The gate shift clock may be input to the gate stages in common and may be a clock signal for shifting the gate start pulse.

The timing controller 5 may control a sensing driving timing and a display driving timing of the pixel lines PL1 to PL4 of the display panel 10 on the basis of a predetermined sequence, and thus, may implement display driving and sensing driving.

The sensing driving may be used for sensing a threshold voltage of a driving element included in each of the pixels PXL and may include a first sensing process for slow sensing and a second sensing process for fast sensing. The slow sensing may be used for obtaining a normal sensing value of each of some pixels PXL, and the fast sensing may be used for obtaining a temporary sensing value of each of all pixels PXL.

The sensing driving may further include a process of calculating a temporary sensing deviation value between adjacent pixels PXL on the basis of the temporary sensing value, obtaining a compensation value for some pixels PXL on the basis of the normal sensing value, and obtaining a delta compensation value for the other pixels PXL (i.e., pixels on which the slow sensing is not performed) except the some pixels PXL on the basis of the normal sensing value and the temporary sensing deviation value.

A second sensing period for the fast sensing may be far shorter than a first sensing period for the slow sensing, and thus, a total sensing time according to the present aspect may be considerably shortened compared to a case where the slow sensing is performed on all pixels. Also, in the present aspect, because the delta compensation value based on a temporary sensing value is applied to pixels PXL on which the slow sensing is not performed, threshold voltage compensation performance on pixels PXL on which the slow sensing is not performed may be considerably enhanced compared to a case where a calculation compensation value based on a simple interpolation scheme is applied.

The display driving may denote a process of correcting image data which is to be input to each of pixels PXL, based on an updated compensation value, and applying display data voltages corresponding to corrected image data to the pixels PXL to display an input image on a screen (hereinafter referred to as screen reproduction).

The display driving may be performed in a vertical active period where a data enable signal is shifted between a logic high level and a logic low level in one frame, and the sensing driving may be performed in a vertical blank period in which data of the input image is not received and an image is not output except the vertical active period in one frame. In the vertical blank period, the data enable signal may continuously maintain a logic low level. The sensing driving may be performed in a power on period until before screen reproduction starts from after a system main power is applied, or may be performed in a power off period until before the system main power is released from after the screen reproduction ends.

The gate driving circuit 15 may be embedded in the display panel 10 as a gate in panel (GIP) type. The gate driving circuit 15 may be disposed in a non-display area outside a display area where the pixel array is provided. The gate driving circuit 15 may include a plurality of gate stages connected with the gate lines 160 of the pixel array. The gate stages may generate the gate signal SCAN for controlling switch elements of the pixels PXL and may supply the gate signal to the gate lines 160.

The data driving circuit 25 embedded in the driver IC 20 may include a plurality of drivers. Each of the drivers may generate a sensing data voltage needed for the sensing driving and a display data voltage needed for the display driving and may supply the sensing data voltage and the display data voltage to the data lines 140. The display data voltage may be a digital-to-analog conversion result of the corrected image data input from the compensation IC 30 and may have a level which varies in pixel units on the basis of a grayscale value and a compensation value. The sensing data voltage may be differently generated in red (R), green (G), blue (B), and white (W) pixels, based on that a driving characteristic of a driving element differs for each color implemented by a light emitting device of each pixel PXL. Colors of pixels are not limited to red (R), green (G), blue (B), and white (W), and may be any color such as cyan, magenta, yellow, etc.

A sensing circuit 24 for the sensing driving may be further embedded in the driver IC 20. The sensing circuit 24 may supply the storage memory 50 with a normal sensing value based on the slow sensing and a temporary sensing value based on the fast sensing as digital sensing result data. The storage memory 50 may be implemented as flash memory, but is not limited thereto, and may be implemented as random access memory (RAM).

The compensation IC 30 may include a compensation circuit 31 and a compensation memory 32. The compensation IC 30 and the timing controller 5 may be implemented as one chip. Alternatively, the compensation IC 30 and the timing controller 5 may be implemented separately The compensation memory 32 may transfer the sensing result data, read from the storage memory 50, to the compensation circuit 31. The compensation memory 32 may be random access memory (RAM) (for example, double data rate synchronous dynamic RAM (DDR SDRAM), dynamic random access memory (DRAM), static random access memory (SRAM), magnetic random access memory (MRAM), resistive random access memory (ReRAM), ferroelectric random access memory (FeRAM) or phase change random access memory (PcRAM), but is not limited thereto.

The compensation circuit 31 may calculate a compensation value by pixels, based on the sensing result data. The compensation circuit 31 may calculate a compensation value for some pixels PXL, based on the normal sensing value based on the slow sensing. The compensation circuit 31 may calculate a temporary sensing deviation value between adjacent pixels PXL on the basis of the temporary sensing value based on the fast sensing and may calculate a delta compensation value for the other pixels PXL (i.e., pixels on which the slow sensing is not performed) except the some pixels PXL on the basis of the normal sensing value and the temporary sensing deviation value. The compensation circuit 31 may correct image data which is to be written in each of some pixels PXL, based on the compensation value, may correct image data which is to be written in each of the other pixels PXL, based on the delta compensation value, and may supply corrected image data to the data driving circuit 25.

Figure 3:
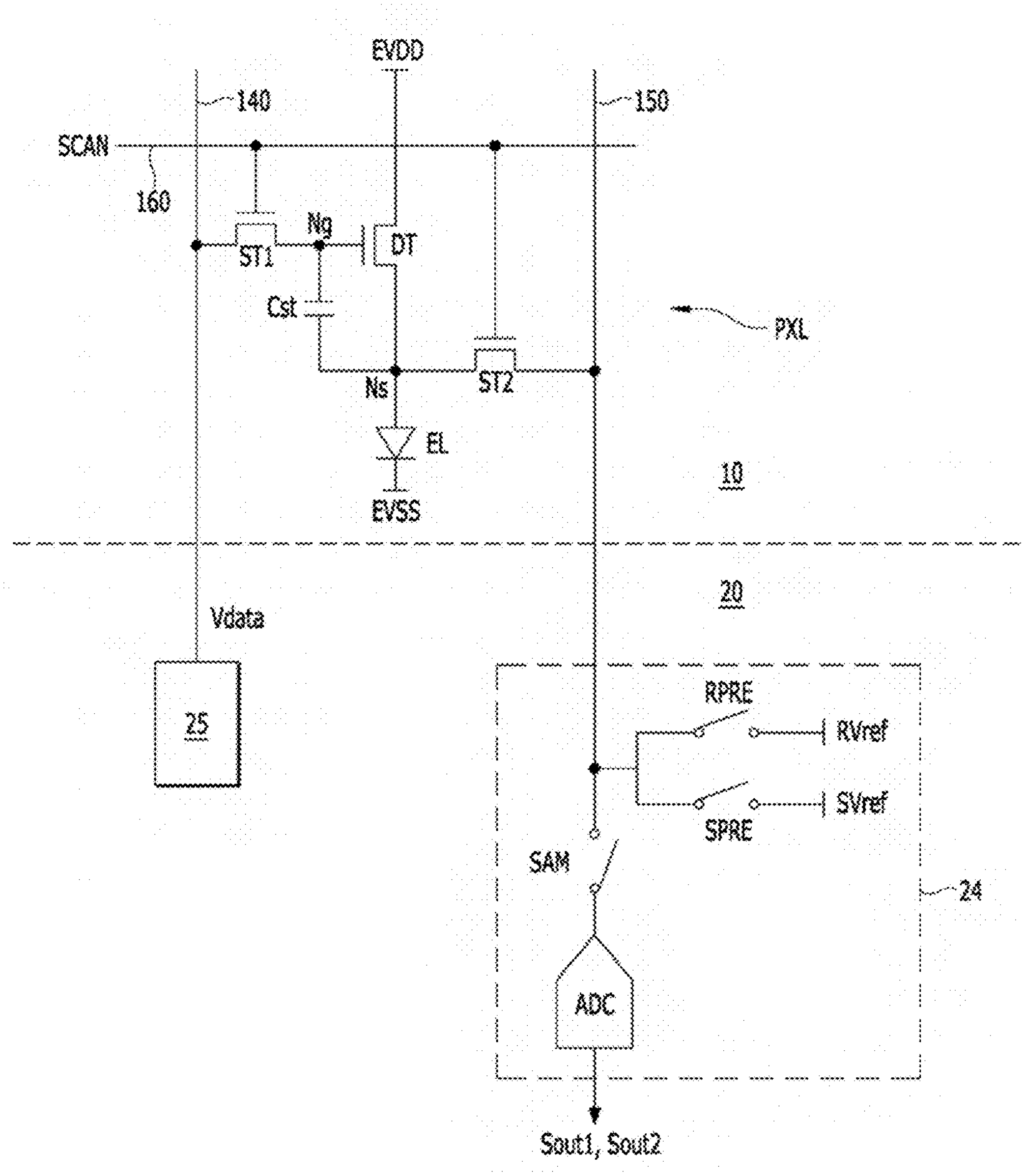
FIG. 3 is a diagram illustrating a connection configuration between a driver integrated circuit and a pixel according to an exemplary aspect of the present disclosure.

FIG. 3 is a diagram illustrating a connection configuration between a driver IC 20 and a pixel PXL.

Referring to FIG. 3, the pixel PXL may include a light emitting device EL, a driving element DT, a plurality of switch elements ST1 and ST2, and a storage capacitor Cst. The driving element DT and the switch elements ST1 and ST2 may each be implemented as an NMOS transistor, but are not limited thereto. For example, the switch elements ST1 and ST2 may each be implemented as a PMOS transistor, or one of the switch elements ST1 and ST2 may be implemented as an NMOS transistor, and the other of the switch elements ST1 and ST2 may be implemented as a PMOS transistor.

The light emitting device EL may emit light with a pixel current supplied from the driving element DT. The light emitting device EL may be implemented as an organic light emitting diode including an organic emission layer, or may be implemented as an inorganic light emitting diode including an inorganic emission layer. An anode electrode of the light emitting device EL may be connected with a source node Ns, and a cathode electrode thereof may be connected with an input terminal of a low level pixel voltage EVSS.

The driving element DT may be a driving transistor which generates a pixel current, based on a gate-source voltage. A gate electrode of the driving element DT may be connected with a first node Ng, a drain electrode thereof may be connected with an input terminal of a high level pixel voltage EVDD through a high level power line PWL, and a source electrode thereof may be connected with the source node Ns.

The switch elements ST1 and ST2 may be switch transistors which, when turned on, connect the gate electrode of the driving element DT with a data line 140, and connect the source electrode of the driving element DT with a sensing line 150 respectively, thereby setting the gate-source voltage of the driving element DT. The switch elements ST1 and ST2 may be turned on/off based on the same gate signal SCAN or based on different gate signals.

The first switch element ST1 may be connected between the data line 140 and the gate node Ng and may be turned on based on the gate signal SCAN transferred through a gate line 160. The first switch element ST1 may be turned on for the display driving and may be turned on in the sensing driving. When the first switch element ST1 is turned on, a sensing data voltage or a display data voltage may be applied to the gate node Ng. A gate electrode of the first switch element ST1 may be connected with the gate line 160, a source electrode thereof may be connected with the data line 140, and a drain electrode thereof may be connected with the gate node Ng.

The second switch element ST2 may be connected between the sensing line 150 and the source node Ns and may be turned on based on the gate signal SCAN transferred through the gate line 160. The second switch element ST2 may be turned on for the display driving and may apply a display reference voltage, supplied through the sensing line 150, to the source node Ns. The second switch element ST2 may maintain an on state in performing the sensing driving, may apply a sensing reference voltage, supplied through the sensing line 150, to the source node Ns, and may charge a source node voltage, based on a pixel current of the driving element DT, into the sensing line 150. A gate electrode of the second switch element ST2 may be connected with the gate line 160, a drain electrode thereof may be connected with the source node Ns, and a source electrode thereof may be connected with the sensing line 150.

The storage capacitor Cst may be connected between the gate node Ng and the source node Ns and may store a gate-source voltage of the driving element DT.

Referring to FIG. 3, the driver IC 20 may include a data driving circuit 25 which outputs a sensing/display data voltage Vdata to the data line 140 and a sensing circuit 24 which is connected with the pixel PXL through the sensing line 150.

The sensing circuit 24 may include a first switch RPRE, a second switch SPRE, a sampling switch SAM, and an analog-to-digital converter ADC and may implement the sensing driving which includes the slow sensing and the fast sensing described above.

The first switch RPRE may be turned on and may apply a display reference voltage RVref to the sensing line 150. The first switch RPRE may be turned on for the display driving and may maintain an off state in performing the sensing driving.

The second switch SPRE may be turned on and may apply a sensing reference voltage SVref to the sensing line 150. The second switch SPRE may maintain an off state in performing the display driving and may be turned on in programming for the sensing driving.

The sampling switch SAM may be turned on in performing the sensing driving for sampling and may connect the sensing line 150 with the analog-to-digital converter ADC. When the sampling switch SAM is turned on, a source node voltage of the pixel PXL charged into the sensing line 150 may be applied to the analog-to-digital converter ADC.

In the present aspect, a sensing period may be defined as a time up to an end timing of sampling from an end timing of the sensing driving. Here, a second sensing period for driving of the fast sensing may be far shorter than a first sensing period for driving of the slow sensing.

The analog-to-digital converter ADC may convert a normal sensing value, input through the sampling switch SAM in the first sensing period, into digital first sensing result data Sout1 and may convert a temporary sensing value, input through the sampling switch SAM in the second sensing period, into digital second sensing result data Sout2. The analog-to-digital converter ADC may supply the first and second sensing result data Sout1 and Sout2 to a storage memory 50 (see FIG. 1).

Figure 4:
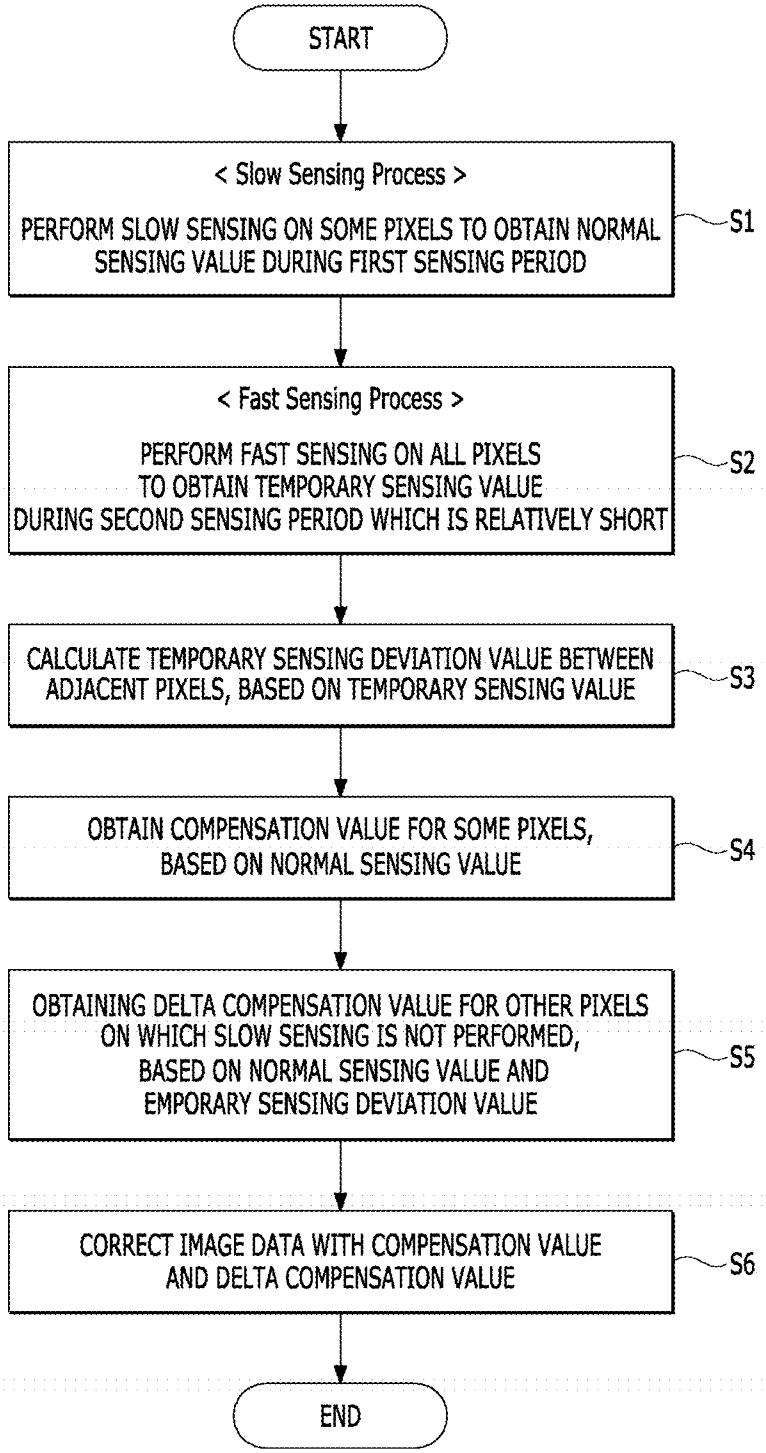
FIG. 4 is a diagram illustrating a driving method of n display apparatus according to an exemplary aspect of the present disclosure.
Figure 5:
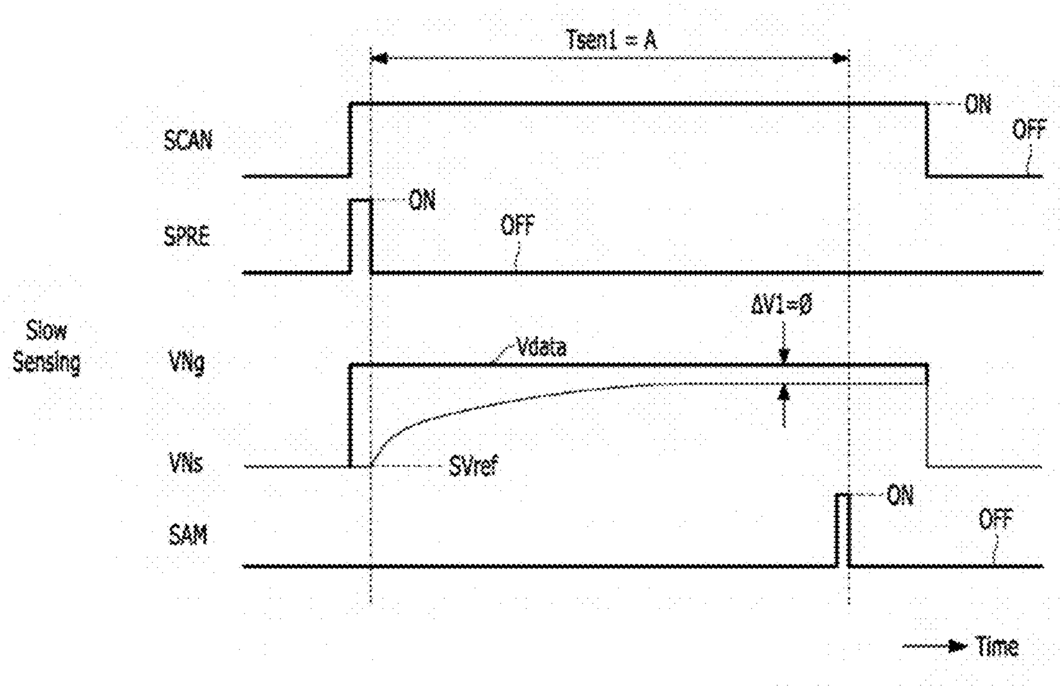
FIG. 5 is a driving waveform in performing slow sensing according to an exemplary aspect of the present disclosure.
Figure 6:
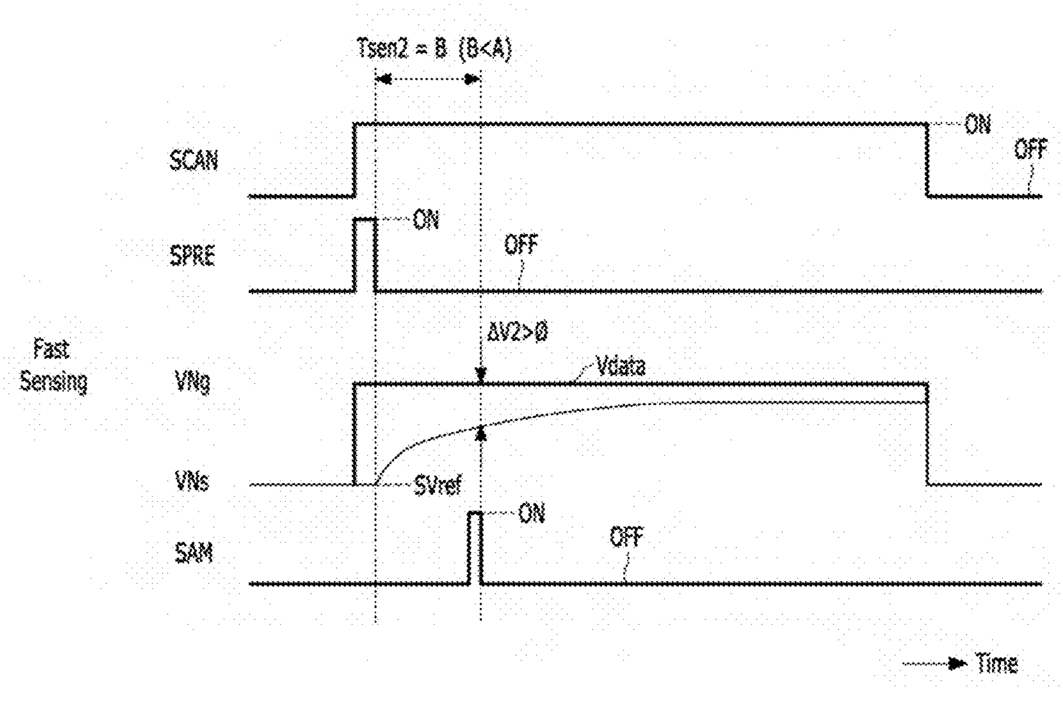
FIG. 6 is a driving waveform in performing fast sensing according to an exemplary aspect of the present disclosure.
Figure 7:
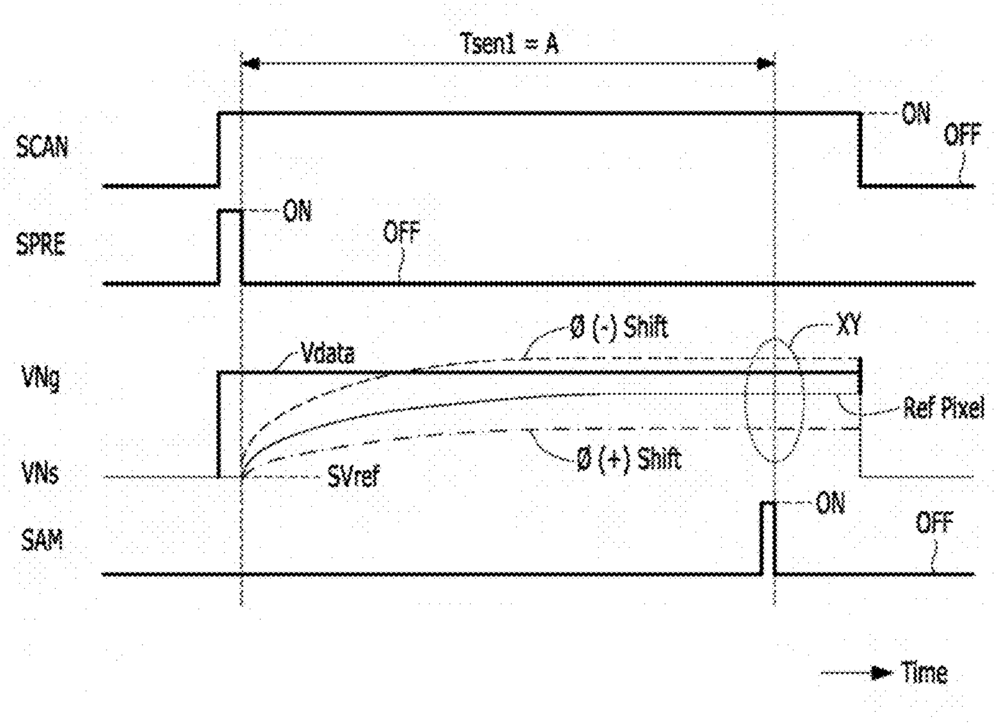
FIG. 7 is a diagram showing a sensing waveform of a source node voltage with respect to a shift of a threshold voltage in performing slow sensing according to an exemplary aspect of the present disclosure.
Figure 8:
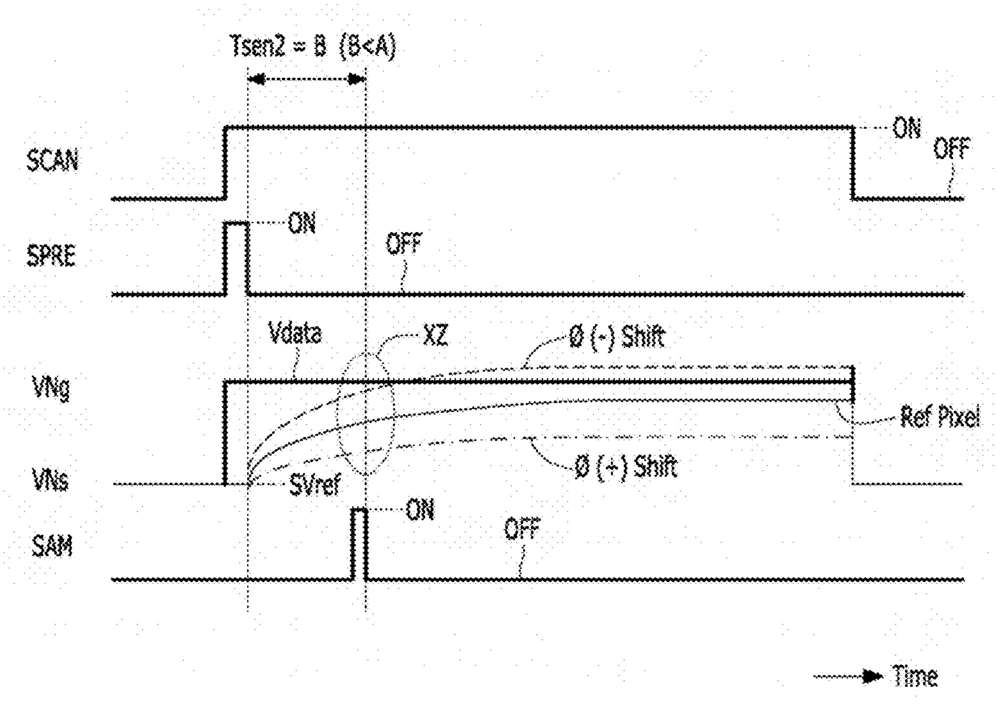
FIG. 8 is a diagram showing a sensing waveform of a source node voltage with respect to a shift of a threshold voltage in performing fast sensing according to an exemplary aspect of the present disclosure.

FIG. 4 is a diagram illustrating a driving method of a (e.g., electroluminescent) display apparatus, apparatus according to the present aspect. FIG. 5 is a driving waveform in performing slow sensing according to the present aspect. FIG. 6 is a driving waveform in performing fast sensing according to the present aspect. FIG. 7 is a diagram showing a sensing waveform of a source node voltage with respect to a shift of a threshold voltage in performing slow sensing according to the present aspect. FIG. 8 is a diagram showing a sensing waveform of a source node voltage with respect to a shift of a threshold voltage in performing fast sensing according to the present aspect.

Referring to FIG. 4, sensing driving according to the present aspect may include a first sensing process S1 for the slow sensing, a second sensing process S2 for the fast sensing, a temporary sensing deviation value calculation process S3, compensation value/delta compensation value calculation processes S4 and S5, and an image data correction process S6. S1 and S2 may be performed by the sensing circuit 24 described above, and S3 to S6 may be performed by the compensation circuit 31 described above.

The first sensing process S1, as in FIG. 5, may be a step of performing the slow sensing on some pixels of a display panel to obtain a normal sensing value during a first sensing period Tsen1. A sensing circuit may sense a source node voltage VNs of a driving transistor in a state where a gate-source voltage ΔV1="VNg−VNs" of the driving transistor is saturated to a threshold voltage φ, during the first sensing period Tsen1. The first sensing period Tsen1 for the slow sensing may be a time A up to a timing, at which the sampling switch SAM is changed from an on state to an off state, from a timing at which a second switch SPRE is changed from an on state to an off state.

As in FIG. 7, the normal sensing value (i. e., the source node voltage VNs of the driving transistor) obtained through the slow sensing may be shifted in level, based on the degree of shift of a threshold voltage φ, and thus, in the present aspect, a shift of a threshold voltage φ of each of the some pixels may be accurately seen through the source node voltage VNs of the driving transistor. For example, at a sampling timing XY in driving of the slow sensing, for a (−)-shifted threshold voltage φ, the temporal sensing value of each of the some pixels may be sampled to a value which is greater than a reference value, and for a (+)-shifted threshold voltage φ, the temporal sensing value of each of the some pixels may be sampled to a value which is less than a normal value.

The second sensing process S2, as in FIG. 6, may be a step of performing the fast sensing on all pixels of the display panel to obtain a temporary sensing value during a second sensing period Tsen2. The sensing circuit may sense a second source node voltage VNs of the driving transistor in a state where the gate-source voltage ΔV1="VNg−VNs" of the driving transistor is not saturated to the threshold voltage φ, during the second sensing period Tsen2. The second sensing period Tsen2 for the fast sensing may be a time B up to a timing, at which the sampling switch SAM is changed from an on state to an off state, from a timing at which the second switch SPRE is changed from an on state to an off state. The second sensing period (Tsen2, B) for the fast sensing may be far shorter than the first sensing period (Tsen1, A) for the slow sensing.

As in FIG. 8, the temporal sensing value (i. e., the source node voltage VNs of the driving transistor) obtained through the fast sensing may be shifted in level, based on the degree of shift of a threshold voltage φ, and thus, in the present aspect, a shift of a threshold voltage φ of each of all pixels may be schematically seen through the source node voltage VNs of the driving transistor. For example, at a sampling timing XZ in driving of the fast sensing, for a (−)-shifted threshold voltage φ, the temporal sensing value of each of all pixels may be sampled to a value which is greater than the reference value, and for a (+)-shifted threshold voltage φ, the temporal sensing value of each of all pixels may be sampled to a value which is less than the normal value.

The temporary sensing deviation value calculation process S3 may be a step of calculating a temporary sensing deviation value between adjacent pixels, based on the temporary sensing value obtained through the fast sensing.

The compensation value/delta compensation value calculation processes S4 and S5 may include a compensation value calculation process S4 and a delta compensation value calculation process S5.

The compensation value calculation process S4 may be a step of detecting the shift of the threshold voltage φ of each of the some pixels, based on the normal sensing value obtained through the slow sensing, and calculating a compensation value for compensating for a luminance change corresponding to the shift of the threshold voltage φ.

The delta compensation value calculation process S5 may be a step of detecting a shift of a threshold voltage φ of each of the other pixels (i.e., pixels on which the slow sensing is not performed) except the some pixels by using the normal sensing value obtained through the slow sensing and the temporary sensing deviation value based on the fast sensing and calculating a delta compensation value for compensating for a luminance change corresponding to the shift of the threshold voltage φ. The delta compensation value may be for compensating for a shift of a threshold voltage φ based on a summing result of the normal sensing value and the temporary sensing deviation value, and thus, the accuracy of compensation of pixels on which the slow sensing is not performed may be considerably enhanced.

The image data correction process S6 may be a step of correcting digital image data which is to be written in each of the some pixels PXL, based on the compensation value, and correcting digital image data which is to be written in each of the other pixels PXL, based on the delta compensation value. Based on such image data correction, a shift of a threshold voltage of a driving transistor included in each of all pixels may be compensated for.

Figure 9:
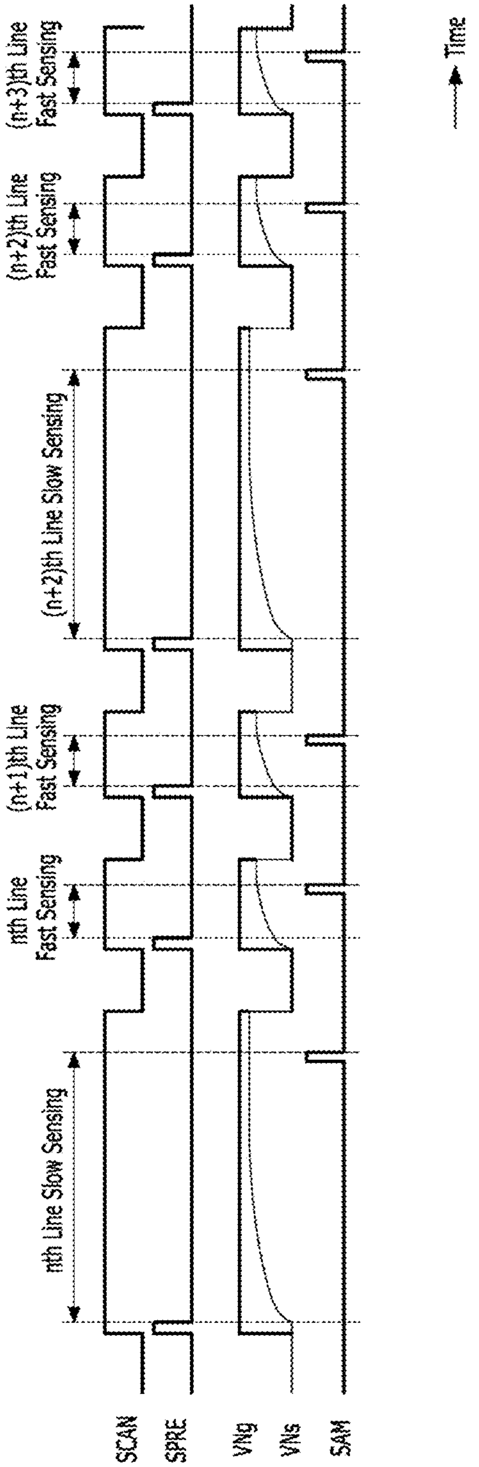
FIG. 9 is a diagram showing an example of a temporal arrangement sequence of a first sensing process for slow sensing and a second sensing process for fast sensing according to an exemplary aspect of the present disclosure.

FIG. 9 is a diagram showing an example of a temporal arrangement sequence of the first sensing process for the slow sensing and the second sensing process for the fast sensing.

Referring to FIG. 9, a sensing circuit according to the present aspect may perform the first sensing process for the slow sensing on an $n^{th}$ (where n may be a natural number) pixel line, and then, may perform the second sensing process for the fast sensing on the $n^{th}$ pixel line and an $(n+1)^{th}$ pixel line. Subsequently, the sensing circuit according to the present aspect may perform the first sensing process for the slow sensing on an $(n+2)^{th}$ pixel line, and then, may perform the second sensing process for the fast sensing on the $(n+2)^{th}$ pixel line and an $(n+3)^{th}$ pixel line.

Figure 10:
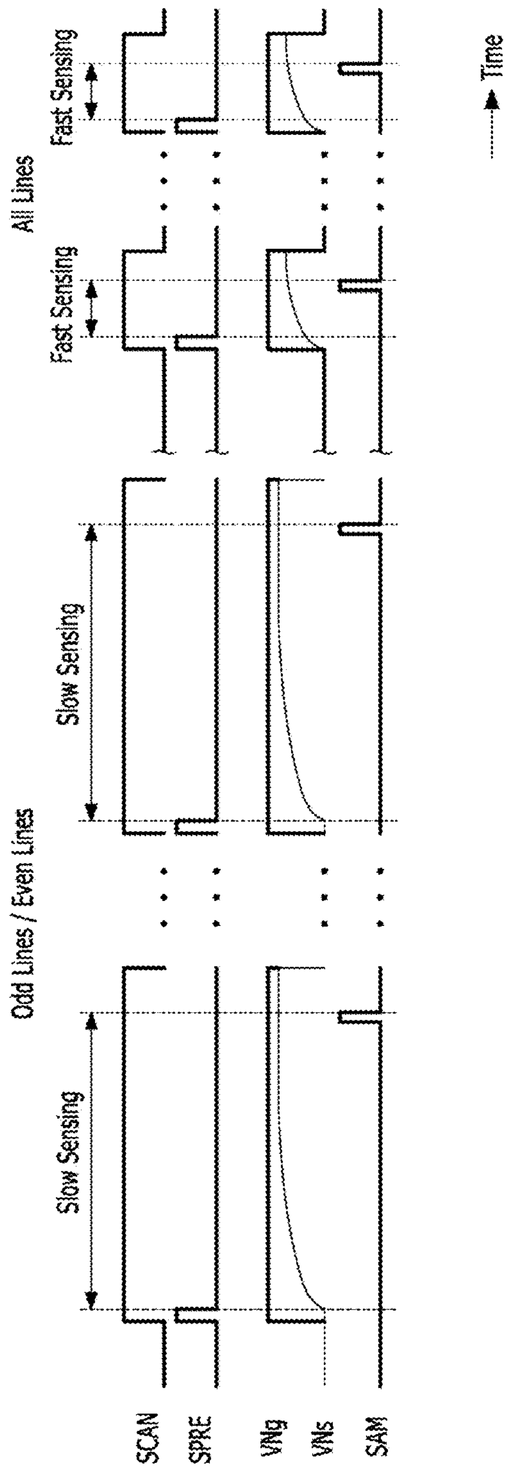
FIG. 10 is a diagram showing another example of a temporal arrangement sequence of a first sensing process for slow sensing and a second sensing process for fast sensing according to an exemplary aspect of the present disclosure.

FIG. 10 is a diagram showing another example of a temporal arrangement sequence of the first sensing process for the slow sensing and the second sensing process for the fast sensing.

Referring to FIG. 10, a sensing circuit according to the present aspect may perform the first sensing process for the slow sensing on one of odd pixel lines and even pixel lines of a display panel, and then, may perform the second sensing process for the fast sensing on all pixel lines of the display panel.

Alternatively, the sensing circuit according to the present aspect may perform the first sensing process for the slow sensing on the other one of the odd pixel lines and the even pixel lines of the display panel, and then, may perform the second sensing process for the fast sensing on all pixel lines of the display panel.

FIGS. 11 to 14 are diagrams showing various examples of calculating a temporary sensing deviation value between adjacent pixels and various examples of obtaining a delta compensation value on pixels on which slow sensing is not performed, based on the calculated temporary sensing deviation value.

Figure 11:
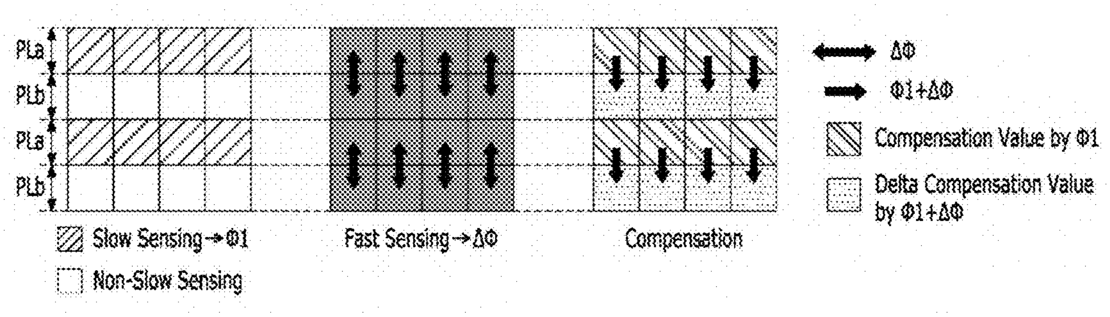
FIGS. 11 to 14 are diagrams showing various examples of calculating a temporary sensing deviation value between adjacent pixels and various examples of obtaining a delta compensation value on pixels on which slow sensing is not performed, based on the calculated temporary sensing deviation value according to an exemplary aspect of the present disclosure.
Figure 12:
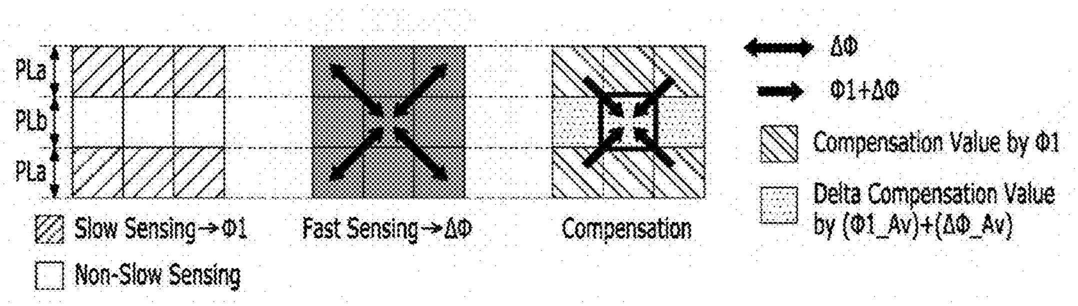
Figure 13:
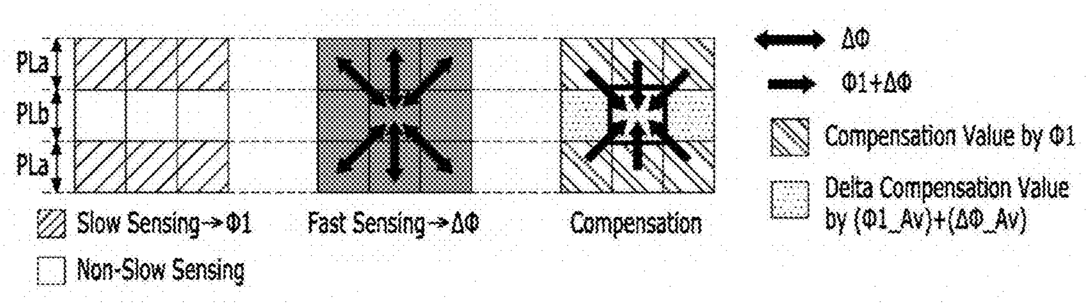

Referring to FIGS. 11 to 13, in the present aspect, some pixels of a display panel on which the slow sensing is to be performed may be arranged in one of odd pixel lines PLa and even pixel lines PLb of the display panel. Also, the other pixels of the display panel on which the slow sensing is not to be performed may be arranged in the other one of the odd pixel lines PLa and the even pixel lines PLb of the display panel. In this case, the some pixels and the other pixels of the display panel may be pixels which implement the same color. For example, the some pixels and the other pixels of the display panel may be pixels having one color among red (R), green (G), blue (B), and white (W) pixels.

Figure 14:
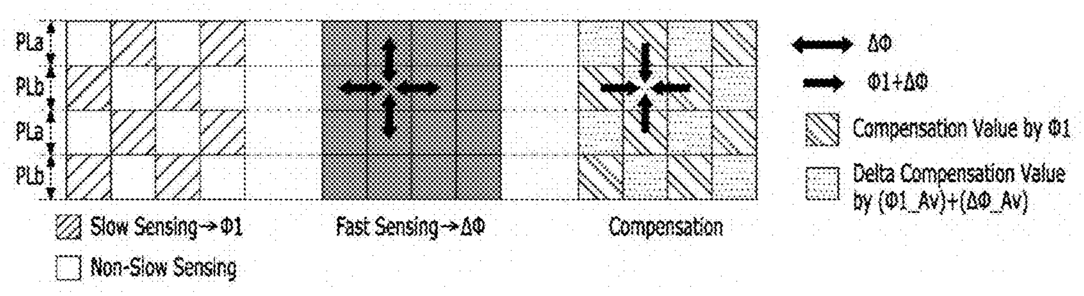

Referring to FIG. 14, in the present aspect, some pixels of a display panel on which the slow sensing is to be performed and the other pixels of the display panel on which the slow sensing is not to be performed may implement a check pattern. To implement the check pattern, some four pixels may surround one pixel, and other four pixels may surround another pixel. In this case, some pixels and the other pixels of the display panel may be pixels which implement a plurality of colors. For example, the some pixels and the other pixels of the display panel may include red (R), green (G), blue (B), and white (W) pixels.

Referring to FIGS. 11 to 14, the sensing circuit may perform the slow sensing on some pixels (obliquely-striped pixels) of the display panel to obtain a normal sensing value φ1 during the first sensing period. The sensing circuit may perform the fast sensing on all pixels (obliquely-striped pixels and unstriped pixels) of the display panel to obtain a temporary sensing value during the second sensing period.

Referring to FIG. 11, a compensation circuit may calculate a temporary sensing deviation value Δφ between adjacent pixels, based on a temporary sensing value of each of pixels arranged vertically adjacent to one another. In detail, the compensation circuit may perform a differential operation on temporary sensing values of pixels arranged vertically adjacent to one another to calculate a temporary sensing deviation value Δφ.

Moreover, the compensation circuit may calculate a compensation value for some pixels (obliquely-striped pixels) to obtain the normal sensing value φ1 and may calculate a delta compensation value for the other pixels (unstriped pixels) except the some pixels, based on a summing result "φ1+Δφ" of the normal sensing value φ1 and the temporary sensing deviation value Δφ.

Referring to FIG. 12, the compensation circuit may calculate a temporary sensing deviation value Δφ between adjacent pixels, based on temporary sensing values of pixels arranged diagonally adjacent to one another. In detail, the compensation circuit may perform a differential operation on temporary sensing values of pixels arranged diagonally adjacent to one another to calculate four temporary sensing deviation values Δφ and may average the four temporary sensing deviation values Δφ to calculate an average temporary sensing deviation value "Δφ_Av" between adjacent pixels.

Moreover, the compensation circuit may calculate a compensation value for some pixels (obliquely-striped pixels), based on a normal sensing value φ1, and may calculate a delta compensation value for the other pixels (unstriped pixels) except the some pixels, based on a summing result "φ1_Av+Δφ_Av" of the average temporary sensing deviation value "Δφ_Av" and an average normal sensing value "φ1_Av" for some pixels arranged diagonally adjacent to one another.

Referring to FIG. 13, the compensation circuit may calculate a temporary sensing deviation value Δφ between adjacent pixels, based on temporary sensing values of pixels arranged vertically and diagonally adjacent to one another. In detail, the compensation circuit may perform a differential operation on temporary sensing values of pixels arranged vertically and diagonally adjacent to one another to calculate six temporary sensing deviation values Δφ and may average the six temporary sensing deviation values Δφ to calculate an average temporary sensing deviation value "Δφ_Av" between adjacent pixels.

Moreover, the compensation circuit may calculate a compensation value for some pixels (obliquely-striped pixels), based on a normal sensing value φ1, and may calculate a delta compensation value for the other pixels (unstriped pixels) except the some pixels, based on a summing result "φ1_Av+Δφ_Av" of the average temporary sensing deviation value "Δφ_Av" and an average normal sensing value "φ1_Av" for some pixels arranged vertically and diagonally adjacent to one another.

Referring to FIG. 14, the compensation circuit may calculate a temporary sensing deviation value Δφ between adjacent pixels, based on temporary sensing values of pixels arranged vertically and horizontally adjacent to one another. In detail, the compensation circuit may perform a differential operation on temporary sensing values of pixels arranged vertically and horizontally adjacent to one another to calculate four temporary sensing deviation values Δφ and may average the four temporary sensing deviation values Δφ to calculate an average temporary sensing deviation value "Δφ_Av" between adjacent pixels.

Moreover, the compensation circuit may calculate a compensation value for some pixels (obliquely-striped pixels), based on a normal sensing value φ1, and may calculate a delta compensation value for the other pixels (unstriped pixels) except the some pixels, based on a summing result "φ1_Av+Δφ_Av" of the average temporary sensing deviation value "Δφ_Av" and an average normal sensing value "φ1_Av" for some pixels arranged vertically and horizontally adjacent to one another.

According to the present aspects, the sensing driving may include the first sensing process for the slow sensing and the second sensing process for the fast sensing. The slow sensing may be used for obtaining a normal sensing value of each of some pixels, and the fast sensing may be used for obtaining a temporary sensing value of each of all pixels.

The second sensing period for the fast sensing may be far shorter than the first sensing period for the slow sensing, and thus, a total sensing time according to the present aspect may be considerably shortened compared to a case where the slow sensing is performed on all pixels. Also, in the present aspect, because a delta compensation value based on a temporary sensing value is applied to pixels on which the slow sensing is not performed, threshold voltage compensation performance on pixels on which the slow sensing is not performed may be considerably enhanced compared to a case where a calculation compensation value based on the simple interpolation scheme is applied.

The effects according to the present disclosure are not limited to the above examples, and other various effects may be included in the specification.

While the present disclosure has been particularly shown and described with reference to exemplary aspects thereof, it will be understood by those of ordinary skill in the art that various changes in form and details may be made therein without departing from the spirit and scope of the present disclosure as defined by the following claims.

It will be apparent to those skilled in the art that various modifications and variations can be made in the electroluminescent display apparatus and the driving method thereof of the present disclosure without departing from the spirit or scope of the aspects of the present disclosure. Thus, it is intended that the present disclosure covers the modifications and variations of the aspects provided they come within the scope of the appended claims and their equivalents.

What is claimed is:

1. A display apparatus comprising:

a display panel;

a sensing circuit performing a first sensing process on each of some pixels of the display panel to obtain a first sensing value during a first sensing period and performing a second sensing process on each of all pixels of the display panel to obtain a second sensing value during a second sensing period; and a compensation circuit calculating a plurality of second sensing deviation values between adjacent pixels, based on a plurality of second sensing values of the adjacent pixels, obtaining a compensation value for each of the some pixels, based on a plurality of first sensing values, and obtaining a delta compensation value for each of other pixels which are pixels on which the first sensing process is not performed, based on the plurality of first sensing values and the plurality of second sensing deviation values.

2. The display apparatus of claim 1, wherein the second sensing period is shorter than the first sensing period.

3. The display apparatus of claim 2, wherein each of the all pixels comprises a driving transistor, and wherein the sensing circuit senses a voltage of a first node of the driving transistor in a state where a gate-source voltage of the driving transistor is saturated, during the first sensing period, and senses the voltage of the first node of the driving transistor in a state where the gate-source voltage of the driving transistor is not saturated, during the second sensing period.

4. The display apparatus of claim 1, wherein the some pixels of the display panel on which the first sensing process is to be performed are arranged in one of odd pixel lines and even pixel lines of the display panel, and the other pixels of the display panel are arranged in the other one of the odd pixel lines and the even pixel lines of the display panel.

5. The display apparatus of claim 1, wherein the some pixels of the display panel on which the first sensing process is to be performed and the other pixels of the display panel on which the first sensing process is not to be performed implement a check pattern, and to implement the check pattern, each of the some pixels is surrounded by four pixels among the other pixels.

6. The display apparatus of claim 1, wherein the sensing circuit performs the first sensing process for a slow sensing on an nth pixel line, where n is a natural number, subsequently performs the second sensing process for a fast sensing on the nth pixel line and an (n+1)th pixel line, subsequently performs the first sensing process for the slow sensing on an (n+2)th pixel line, and subsequently performs the second sensing process for the fast sensing on the (n+2)th pixel line and an (n+3)th pixel line.

7. The display apparatus of claim 1, wherein the sensing circuit performs the first sensing process for a slow sensing on one of odd pixel lines and even pixel lines of the display panel, subsequently performs the second sensing process for a fast sensing on all pixel lines of the display panel, subsequently performs the first sensing process for the slow sensing on the other one of the odd pixel lines and the even pixel lines of the display panel, and subsequently performs the second sensing process for the fast sensing on all pixel lines of the display panel.

8. The display apparatus of claim 1, wherein the compensation circuit calculates the second sensing deviation value between the adjacent pixels, based on the second sensing value of each of the pixels arranged vertically adjacent to one another.

9. The display apparatus of claim 1, wherein the compensation circuit calculates the second sensing deviation value between the adjacent pixels, based on the second sensing value of each of the pixels arranged diagonally adjacent to one another.

10. The display apparatus of claim 1, wherein the compensation circuit calculates the second sensing deviation value between the adjacent pixels, based on the second sensing value of each of the pixels arranged vertically and diagonally adjacent to one another.

11. The display apparatus of claim 1, wherein the compensation circuit calculates the second sensing deviation value between the adjacent pixels, based on the second sensing value of each of the pixels arranged vertically and horizontally adjacent to one another.

12. A driving method of a display apparatus, the driving method comprising:

performing a first sensing process on each of some pixels of a display panel to obtain a first sensing value during a first sensing period;

performing a second sensing process on each of all pixels of the display panel to obtain a second sensing value during a second sensing period;

calculating a plurality of second sensing deviation values between adjacent pixels, based on a plurality of second sensing values of the adjacent pixels; and obtaining a compensation value for each of the some pixels, based on a plurality of first sensing values, and obtaining a delta compensation value for each of other pixels which are pixels on which the first sensing process is not performed, based on the plurality of first sensing values and the plurality of second sensing deviation values.

13. The driving method of claim 12, wherein the second sensing period is shorter than the first sensing period.

* * * * *